United States Patent
Du et al.

(10) Patent No.: US 9,886,622 B2
(45) Date of Patent: Feb. 6, 2018

(54) ADAPTIVE FACIAL EXPRESSION CALIBRATION

(71) Applicant: Intel Corporation, Santa Clara, CA (US)

(72) Inventors: Yangzhou Du, Beijing (CN); Wenlong Li, Beijing (CN); Wei Hu, Beijing (CN); Xiaofeng Tong, Beijing (CN); Yimin Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 95 days.

(21) Appl. No.: 13/976,039

(22) PCT Filed: Mar. 14, 2013

(86) PCT No.: PCT/CN2013/072594
§ 371 (c)(1),
(2) Date: Feb. 7, 2014

(87) PCT Pub. No.: WO2014/139118
PCT Pub. Date: Sep. 18, 2014

(65) Prior Publication Data
US 2014/0267413 A1 Sep. 18, 2014

(51) Int. Cl.
*G06T 13/40* (2011.01)
*G06K 9/00* (2006.01)
(Continued)

(52) U.S. Cl.
CPC ........ *G06K 9/00281* (2013.01); *A63F 13/213* (2014.09); *A63F 13/655* (2014.09);
(Continued)

(58) Field of Classification Search
CPC .......... G06T 13/00; G06T 2207/30201; G06K 9/00268; G06K 9/00281
See application file for complete search history.

(56) References Cited

U.S. PATENT DOCUMENTS 7,953,255 B2 * 5/2011 Amento .................. G06T 13/40
382/118

8,026,917 B1 * 9/2011 Rogers .................... G06T 13/40
345/419
9,111,134 B1 * 8/2015 Rogers ............... G06K 9/00302
9,196,074 B1 * 11/2015 Bhat ....................... G06T 17/20
(Continued)

FOREIGN PATENT DOCUMENTS

CN     1996344 A      7/2007
CN   102221886 A     10/2011
(Continued)

OTHER PUBLICATIONS

Avatar Chat, "Avatar Chat City," <http://www.avatar-chat.net>, Oct. 15, 2012, 1 page.
(Continued)

*Primary Examiner* — Barry Drennan
*Assistant Examiner* — Phong Nguyen
(74) *Attorney, Agent, or Firm* — Barnes & Thornburg LLP (57) ABSTRACT

Technologies for generating an avatar with a facial expression corresponding to a facial expression of a user include capturing a reference user image of the user on a computing device when the user is expressing a reference facial expression for registration. The computing device generates reference facial measurement data based on the captured reference user image and compares the reference facial measurement data with facial measurement data of a corresponding reference expression of the avatar to generate facial comparison data. After a user has been registered, the computing device captures a real-time facial expression of the user and generates real-time facial measurement data based on the captured real-time image. The computing device applies the facial comparison data to the real-time facial measurement data to generate modified expression data, which is used to generate an avatar with a facial expression corresponding with the facial expression of the user.

19 Claims, 6 Drawing Sheets

(51) Int. Cl.
G06T 13/80 (2011.01)
A63F 13/655 (2014.01)
A63F 13/213 (2014.01)

(52) U.S. Cl.
CPC .............. *G06T 13/40* (2013.01); *G06T 13/80* (2013.01); *G06T 2215/16* (2013.01)

(56) References Cited

U.S. PATENT DOCUMENTS

| | | | |
|---|---|---|---|
| 2002/0067362 A1* | 6/2002 | Agostino Nocera | G06K 9/00248 345/473 |
| 2003/0007700 A1* | 1/2003 | Gutta | G06T 17/00 382/282 |
| 2007/0009135 A1* | 1/2007 | Ishiyama | G06T 7/0048 382/103 |
| 2007/0159486 A1* | 7/2007 | Sasaki | G06T 13/40 345/473 |
| 2009/0044113 A1* | 2/2009 | Jones | G06T 13/40 715/707 |
| 2009/0066700 A1* | 3/2009 | Harding | G06T 7/2046 345/473 |
| 2009/0086048 A1* | 4/2009 | Jiang | G06T 13/40 348/222.1 |
| 2009/0158170 A1 | 6/2009 | Narayanan et al. | |
| 2010/0002909 A1* | 1/2010 | Lefevre | G06F 3/04815 382/103 |
| 2010/0013832 A1* | 1/2010 | Xiao | G06K 9/00248 345/420 |
| 2010/0141663 A1* | 6/2010 | Becker | G06T 13/40 345/473 |
| 2010/0232657 A1* | 9/2010 | Wang | G06K 9/00275 382/118 |
| 2010/0259538 A1* | 10/2010 | Park | G06T 13/40 345/419 |
| 2010/0284577 A1* | 11/2010 | Hua | G06K 9/00281 382/118 |
| 2011/0007174 A1* | 1/2011 | Bacivarov | G06K 9/00281 348/222.1 |
| 2011/0143728 A1* | 6/2011 | Holopainen | G06K 9/00308 455/414.1 |
| 2011/0216074 A1* | 9/2011 | Witkin | G06T 13/40 345/473 |
| 2011/0304629 A1* | 12/2011 | Winchester | G06T 13/40 345/473 |
| 2011/0304632 A1 | 12/2011 | Evertt et al. | |
| 2012/0007859 A1* | 1/2012 | Lee | G06T 13/40 345/419 |
| 2012/0023135 A1 | 1/2012 | Dahlkvist et al. | |
| 2012/0113106 A1* | 5/2012 | Choi | G06T 17/00 345/419 |
| 2012/0310791 A1 | 12/2012 | Weerasinghe | |
| 2013/0002669 A1* | 1/2013 | Rhee | G06T 13/40 345/420 |
| 2013/0016124 A1* | 1/2013 | Han | G09G 5/00 345/649 |
| 2013/0071012 A1* | 3/2013 | Leichsenring | G06K 9/80 382/154 |
| 2013/0201187 A1 | 8/2013 | Tong et al. | |
| 2013/0215113 A1* | 8/2013 | Corazza | G06T 13/40 345/420 |
| 2013/0286161 A1* | 10/2013 | Lv | G06K 9/00214 348/46 |
| 2014/0043329 A1* | 2/2014 | Wang | G06T 17/20 345/420 |
| 2014/0176662 A1* | 6/2014 | Goodman | H04N 7/141 348/14.07 |

FOREIGN PATENT DOCUMENTS

| | | |
|---|---|---|
| CN | 102640167 A | 8/2012 |
| KR | 1020090022786 A | 3/2009 |
| KR | 1020120018479 A | 3/2012 |
| TW | 201303747 A1 | 1/2013 |
| WO | 03073322 A1 | 9/2003 |
| WO | 2009098671 A2 | 8/2009 |
| WO | 2010037956 A1 | 4/2010 |
| WO | 2012139276 A1 | 10/2012 |
| WO | 2013020247 A1 | 2/2013 |
| WO | 2013097139 A1 | 7/2013 |
| WO | 2013152455 A1 | 10/2013 |

OTHER PUBLICATIONS

Avatar Chat, "Avatar Chat—User Help Section," <http://www.avatar-chat.net/help/index.php>, Apr. 28, 2012, 5 pages.
Hütter, "Visual Chat," <http://visualchat.weirdoz.org>, Sep. 17, 2012, 2 pages.
Gaudin, "Intel exec envisions a future of Avatar Chats," Computerworld, <http://www.computerworld.com/s/article/9231253/Intel_exec_envisions_a_future_of_Avatar_Chats>, Sep. 13, 2012, 2 pages.
Fingas, "Sony takes SOEmote live for EverQuest II, lets gamers show their true CG selves (video)," retrieved from: <http://www.engadget.com/2012/08/07/sony-takes-soemote-live-for-everquest-ii>, Aug. 7, 2012, 3 pages.
Ahlberg, "CANDIDE—a parameterized face," retrieved from: <http://www.icg.isy.liu.se/candide/main.html>, May 24, 2012, 3 pages.
Saragih et al., "Real-time Avatar Animation from a Single Image," 2011 IEEE International Conference on Automatic Face & Gesture Recognition and Workshops (FG 2011), 2011, pp. 117-124.
Cootes et al., "Statistical Models of Appearance for Computer Vision," Mar. 8, 2004, 125 pages.
Baker et al., "Lucas-Kanade 20 Years on: A Unifying Framework," International Journal of Computer Vision 2004, 56(3), pp. 221-255.
Chai et al, "Vision-based Control of 3D Facial Animation," SCA '03 Proceedings of the 2003 ACM SIGGRAPH/Eurographics Symposium on Computer Animation, 2003, 15 pages.
"Dijkstra's algorithm," Wikipedia, the Free Encyclopedia, retrieved from: <http://en.wikipedia.org/w/index.php?title=Dijkstra%27s_algorithm&oldid=508270697>, edited Aug. 20, 2012, 7 pages.
"k-d tree, Wikipedia," The Free Encyclopedia, retrieved from: <http://en.wikipedia.org/w/index.php?title=K-d_tree&oldid=506370749>, edited Aug. 8, 2012, 8 pages.
U.S. Appl. No. 13/976,037, filed Jun. 26, 2013, 38 pages.
International Search Report and Written Opinion received for PCT Patent Application No. PCT/CN2013/072594, dated Dec. 26, 2013, 12 pages.
International Search Report and Written Opinion received for PCT Patent Application No. PCT/CN2013/072679, dated Dec. 19, 2013, 14 pages.
U.S. Appl. No. 13/997,271, filed Jun. 23, 2013, 33 pages.

* cited by examiner

ADAPTIVE FACIAL EXPRESSION CALIBRATION

BACKGROUND

Avatars are becoming an integral part of how we communicate with one another in a digital world. The potential uses for avatars range from increased immersion of a player into a role-playing video game environment to protecting a person's privacy when engaged in remote video chat. In any case, advances in technology and computing algorithms enhance the realism of communication via an avatar. Avatars in video games allow user's to control the facial gestures of mystical creatures and characters with their own facial expressions. Also, in the context of remote video chat, advanced avatars are nearly indistinguishable from actual real-time video of the user.

Although advances in technology typically unleash endless possibilities and near-reality experiences, it comes at a cost. The computational resources typically required for video editing and rendering are considerable, particularly when it comes to rendering life-like video and motion. For example, many applications require devices to have significant graphical processing capabilities and dedicated memory. As such, low-power mobile computing devices are typically unable to implement the certain technologies as effectively as desktop computers and servers. Instead, those devices often must resort to last generation's applications.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
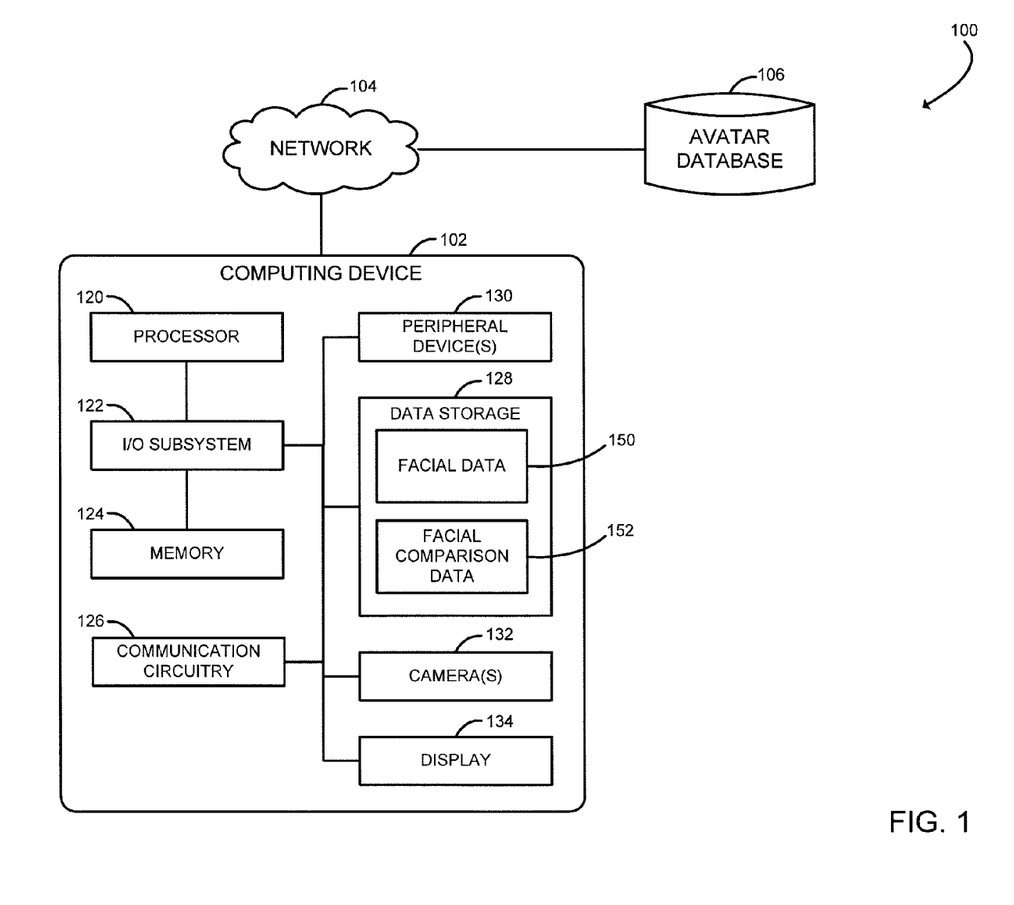
FIG. 1 is a simplified block diagram of at least one embodiment of a system for generating an avatar with a facial expression corresponding to a facial expression of a user.

Referring now to FIG. 1, a system 100 for generating an avatar with a facial expression corresponding to a facial expression of a user includes a computing device 102, a network 104, and an avatar database 106. In use, as discussed in more detail below, the computing device 102 may retrieve data from the avatar database 106 and generate an avatar with a facial expression corresponding to a facial expression of a user (e.g., mimicking the user). Although only one computing device 102, one network 104, and one avatar database 106 are illustratively shown in FIG. 1, the system 100 may include any number of computing devices 102, networks 105, and avatar databases 106. For example, the system 100 may include several computing devices 102 utilizing the same avatar database 106 to generate avatars.

The computing device 102 may be embodied as any type of computing device capable of establishing a communication link with avatar database 106 and performing the functions described herein. For example, the computing device 102 may be embodied as a cellular phone, smartphone, tablet computer, laptop computer, personal digital assistant, mobile Internet device, desktop computer, server, and/or any other computing/communication device. As shown in FIG. 1, the illustrative computing device 102 includes a processor 120, an input/output ("I/O") subsystem 122, a memory 124, a communication circuitry 126, a data storage 128, one or more peripheral devices 130, one or more cameras 132, and a display 134. Of course, the computing device 102 may include other or additional components, such as those commonly found in a typical computing device (e.g., various input/output devices), in other embodiments. Additionally, in some embodiments, one or more of the illustrative components may be incorporated in, or otherwise from a portion of, another component. For example, the memory 124, or portions thereof, may be incorporated in the processor 120 in some embodiments.

The processor 120 may be embodied as any type of processor capable of performing the functions described herein. For example, the processor may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 102, on a single integrated circuit chip.

The communication circuitry 126 of the computing device 102 may be embodied as any communication circuit, device, or collection thereof, capable of enabling communications between the computing device 102 and other remote devices (e.g., the avatar database 106) over the network 104. The communication circuitry 126 may be configured to use any one or more communication technology (e.g., wireless or wired communications) and associated protocols to effect such communication.

The data storage 128 may be embodied as any type of device or devices configured for short-term or long-term storage of data such as, for example, memory devices and circuits, memory cards, hard disk drives, solid-state drives, or other data storage devices. In the illustrative embodiment of FIG. 1, the data storage 128 includes facial data 150 and facial comparison data 152. The facial data 150 includes facial geometry data and/or facial measurement data, which are discussed in detail below. The peripheral devices 130 of the computing device 102 may include any number of additional peripheral or interface devices. The particular devices included in the peripheral devices 130 may depend on, for example, the type and/or intended use of the computing device 102.

The camera 132 may be embodied as any peripheral or integrated device suitable for capturing images, such as a still camera, a video camera, a webcam, or the like. The camera 132 may be used to capture images of the user's various facial expressions (e.g., a reference facial expression, a neutral facial expression, or real-time facial expression). The display 134 of the computing device 102 may be embodied as any one or more display screens on which information may be displayed to a viewer of the computing device 102. The display may be embodied as, or otherwise use, any suitable display technology including, for example, a liquid crystal display (LCD), a light emitting diode (LED) display, a cathode ray tube (CRT) display, a plasma display, and/or other display technology. Although only a single display 134 is illustrated in FIG. 1, it should be appreciated that the computing device 102 may include multiple displays or display screens on which the same or different content may be displayed contemporaneously or sequentially with each other.

The network 104 may be embodied as any number of various wired and/or wireless telecommunication networks. As such, the network 104 may include one or more networks, routers, switches, computers, and/or other intervening devices. For example, the network 104 may be embodied as or otherwise include one or more cellular networks, telephone networks, local or wide area networks, publicly available global networks (e.g., the Internet), or any combination thereof.

The avatar database 106 may be embodied as any electronic arrangement or structure suitable for storing data directed to avatars. In one embodiment, the avatar database 106 stores images of avatars with various facial expressions. Additionally or alternatively, the avatar database 106 may store facial geometry data and/or facial measurement data of avatars with different facial expressions (e.g., reference facial expression or neutral facial expression). In some embodiments, the avatar database 106 is stored on a remote computing device embodied as an enterprise-level server computer, a desktop computer, a laptop computer, a tablet computer, a cellular phone, smartphone, personal digital assistant, mobile Internet device, and/or any other computing/communication device. Further, in one embodiment, access to the avatar database 106 is managed by a web service server, which the computing device 102 may communicate with over the network 104. Of course, in some embodiments, the avatar database 106 or data therefrom may be stored on the computing device 102.

Figure 2:
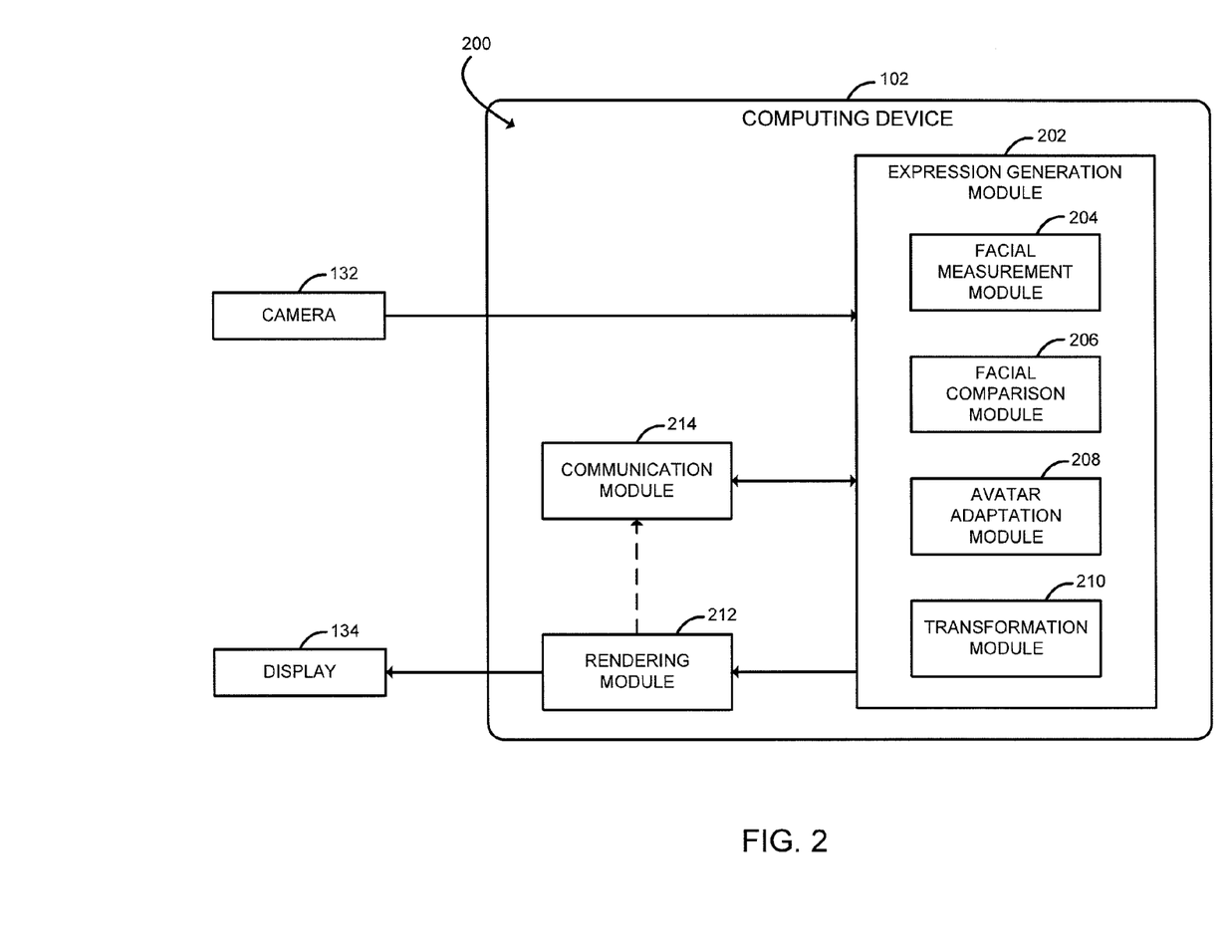
FIG. 2 is a simplified block diagram of at least one embodiment of an environment of the computing device of the system of FIG. 1.

Referring now to FIG. 2, in use, the computing device 102 of the system 100 establishes an environment 200 for generating an avatar with a facial expression corresponding to a facial expression of a user. The environment 200 in the illustrative embodiment includes a expression generation module 202, a rendering module 212, and a communication module 214. Additionally, the expression generation module 202 further includes a facial measurement module 204, a facial comparison module 206, an avatar adaptation module 208, and a transformation module 210. Each of the expression generation module 202, the facial measurement module 204, the facial comparison module 206, the avatar adaptation module 208, the transformation module 210, the rendering module 212, and the communication module 214 may be embodied as hardware, software, firmware, or a combination thereof.

As discussed in more detail below, the expression generation module 202 receives images of a user and avatar data (e.g., through the communication module 214 or from the memory 124, the data storage 128, or the camera 132) and generates modified expression data corresponding to a modified facial expression of the avatar as a function of the user images and the avatar data. The modified expression data may then be used to render the avatar having a facial expression corresponding to a facial expression of the user (e.g., the user's current facial expression).

In doing so, the facial measurement module 204 performs feature detection on a facial image of the user or avatar and generates facial measurement data based on the image. The facial measurement data defines measurements of various facial features of user. For example, in one embodiment, the facial measurement module 204 extracts various features from the image (i.e., facial geometry data). In doing so, the facial measurement module 204 may employ any suitable feature extraction algorithm. For example, the feature extraction algorithm may identify facial landmarks, edges, and/or corners. In one embodiment, the facial measurement module 204 generates a polygon mesh, contour map, or wire frame model corresponding with the extracted facial geometry data. In another embodiment, the facial measurement module 204 simply stores the facial geometry data (e.g., the coordinates of the vertices in the polygon mesh or the extracted feature landmark points). It should be appreciated that the facial geometry data may be stored in any suitable data structure (e.g., as a vector, matrix, array, or n-tuple).

The facial measurement module 204 generates the facial measurement data based on the extracted facial geometry data. Specifically, various facial measurements may be predefined by the system 100. For example, the facial measurements may include the distance between the centers of the eyes and the nose tip, the distance between the upper and lower lips, the distance between the nose wing and the nose tip, the distance between a portion of the eyebrow and a portion of the nose, the distance between the eyebrow and the eye, the distance between the eyebrow tips, the distance between the lower lip and the nose tip, the distance between the upper and lower eyelids, the distance between the side corners of the mouth, the distance between one part of an eyebrow and another part of the same eyebrow, the distance between the upper lip and the nose tip, and/or the distance between the lower lip and the nose tip. Regardless of the particular facial measurements utilized by the system 100, the facial measurement data may be stored or represented in any suitable way (e.g., as a vector, matrix, array, or n-tuple). For example, the facial measurement data is organized or expressed as a shape vector such that each dimension of the shape vector corresponds with a different facial measurement. It should be appreciated that the particular facial measurements and number of facial measurements chosen in a particular embodiment may be carefully selected to accurately represent or reflect most facial expressions. Additionally, facial geometry data and facial measurement data may be generated for a facial image of a person or an avatar. In some embodiments, avatars may be mythical or other non-humanoid characters. As such, data or information may be provided regarding an avatar to indicate the locations of the features of the avatar if the features would not be readily identified via the implemented feature extraction algorithm. For example, facial geometry data and/or facial measurement data may be provided by the avatar database 106 for one or more facial expressions of an avatar (e.g., a reference facial expression).

In some embodiments, the images are required to be in a particular orientation (e.g., front perspective), size, shape, etc. in order to extract features and/or generate accurate facial measurement data. In those embodiments, the transformation module 210 works in tandem with the facial measurement module 204. That is, the transformation module 210 may transform an image of the user and/or avatar to a particular perspective (e.g., via a similarity transform) in order to remove translation, rotation, and scaling factors. In some embodiments, the transformation module 210 ensures that the features are extracted and/or the measurements are made within the same plane and from the same depth (i.e., zoomed in by the same amount). Additionally, the transformation module 210 may transform an image of the user and/or avatar to standardize the images. In other words, the transformation module 210 may, in some embodiments, standardize or normalize images such that they have the same level of granularity or precision.

The facial comparison module 206 compares the facial measurement data of two parties (e.g., the user, actor, or avatar) to generate facial comparison data. For example, the facial comparison module 206 may compare the facial measurement data of a user's reference facial expression with the facial measurement data of an avatar's reference facial expression. Alternatively, the facial comparison module 206 may compare the facial measurement data of a user's reference facial expression with the facial measurement data of an actor's reference facial expression as discussed below in reference to FIG. 6. As discussed above, in some embodiments, the facial measurement data may be represented as a shape vector. In such an embodiment, the facial comparison module 206 may generate the facial comparison data by subtracting the facial measurement data of the user's reference facial expression from the facial measurement data of the avatar's facial expression data.

For example, suppose the facial measurement data of the user's reference facial expression is represented by the vector, $S_{USER}$, and the facial measurement data of the avatar's reference facial expression is represented by the vector, $S_{AVATAR}$. Then, the facial comparison data may be represented by $\Delta S = S_{AVATAR} - S_{USER}$, the vector difference of $S_{AVATAR}$ and $S_{USER}$. Of course, the facial comparison module 206 may compare facial measurement data of various parties using other suitable image processing techniques and algorithms. In some embodiments, facial measurement data of two images are compared only when the facial measurement data of each of those images is corresponding to the same reference facial expression (e.g., a neutral facial expression or a smiling facial expression). Further, in another embodiment, the facial comparison module 206 may directly compare the facial geometry data of one image to the facial geometry data of another image.

The avatar adaptation module 208 generates modified expression data of the avatar by applying the facial comparison data to real-time facial measurement data of the user. As discussed above, the modified expression data may then be used to render (e.g., using the rendering module 212) the avatar having a facial expression corresponding to a facial expression of the user (e.g., the user's current facial expression). In some embodiments, the modified expression data represents facial measurement data for the modified or adapted avatar (i.e., the avatar with the desired modified facial expression), which may be used to generate the desired avatar. In other embodiments, the modified expression data may be other data (e.g., facial geometry data) used to generate the desired avatar. Additionally, the avatar adaptation module 208 may generate the modified expression data or otherwise generate the data for rendering the avatar using any suitable means.

In some embodiments, the avatar adaptation module 208 generates the modified expression data by adding the facial comparison data to real-time facial measurement data of the user. For example, return to the example discussed above in which shape vectors are used to represent the facial measurement data. In such an embodiment, the modified expression data for the avatar, $S'_{AVATAR}$, may be represented by $S'_{AVATAR} = S'_{USER} + \Delta S$, the vector sum of the real-time facial measurement data of the user and the facial comparison data.

As discussed above, in some embodiments, an actor's facial measurement data may be used rather than an avatar's facial measurement data.

The rendering module 212 generates the desired avatar having a facial expression corresponding to the current facial expression of the user based on the modified expression data generated by the avatar adaptation module 208. That is, in some embodiments, the rendering module 212 generates a visual depiction of the modified avatar as a function of the modified expression data. The modified avatar may be displayed on the display 134 of the computing device 102. Of course, if the modified avatar is to be displayed on a remote computing device, the modified avatar may be transmitted to the remote computing device using the communication module 214.

The communication module 214 handles the communication between the computing device 102 and remote devices (e.g., the avatar database 106) through the network 104. As such, the communication module 214 may receive data (e.g., images of the avatar(s) or actors, facial geometry data, and/or facial measurement data) from the avatar database 106 or other remote device and provide the data to the expression generation module 202. Additionally, in some embodiments, the communication module 214 may transmit the modified expression data to a remote computing device for rendering in addition or in the alternative to rendering the avatar on the computing device 102 using the rendering module 212. It should be appreciated that the expression generation module 202 and rendering module 212 may store the data at any one or more stage depending on the embodiment. For example, the images, the facial measurement data, facial geometry data, facial comparison data, modified expression data, and/or rendered avatars may be stored on the computing device 102 for later retrieval. Relatedly, in some embodiments, the facial comparison data is only generated once (i.e., during "registration") on the computing device 102 for any given user-avatar or user-actor pair and that information is stored on the computing device 102 for later use.

Figure 3:
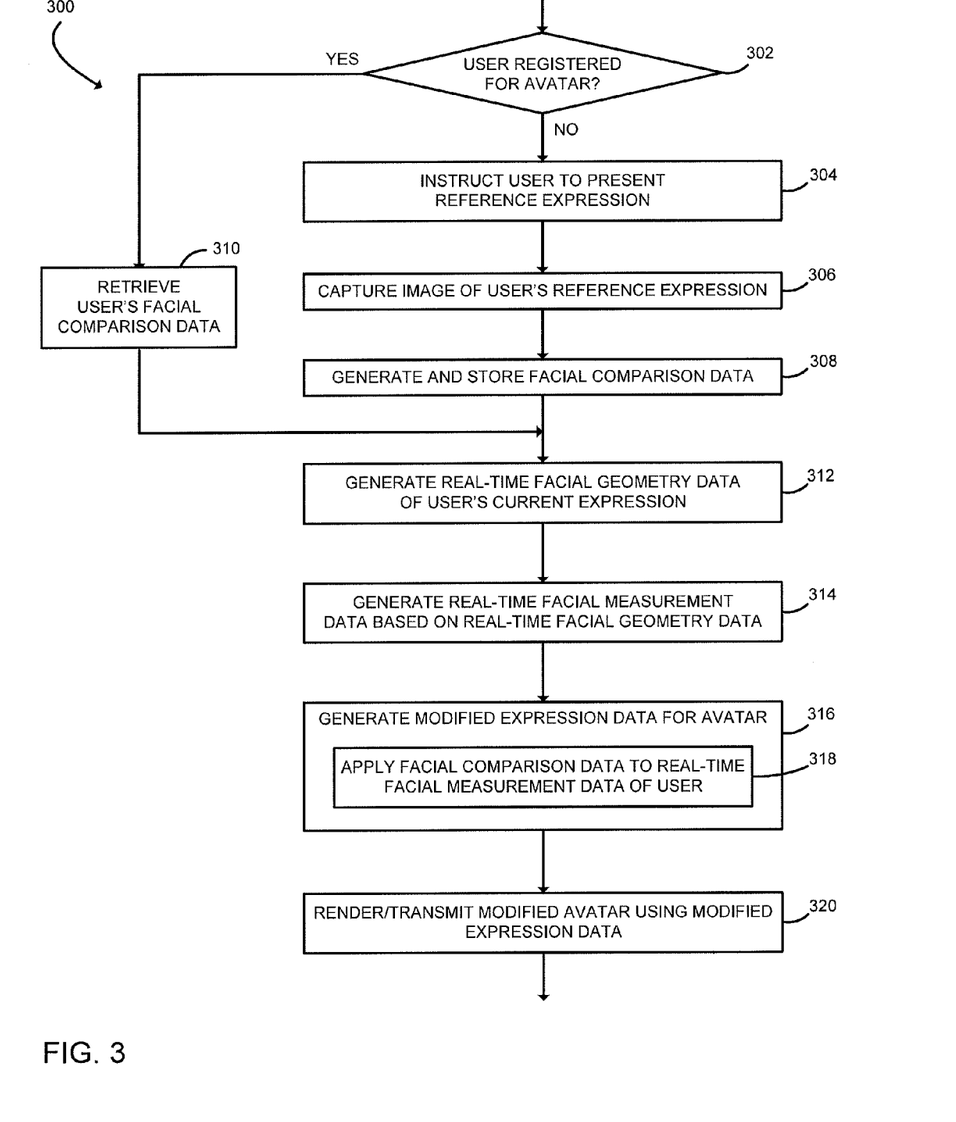
FIG. 3 is a simplified flow diagram of at least one embodiment of a method for generating an avatar with a facial expression corresponding to a facial expression of a user on the computing device of the system of FIG. 1.

Referring now to FIG. 3, in use, the computing device 102 of the system 100 may execute a method 300 for generating an avatar with a facial expression corresponding to a facial expression of a user. For example, the user may register her face with the computing device 102 for a particular avatar. The computing device 102 may then capture (e.g., continuously or periodically) the user's real-time facial expression and generate an avatar with a facial expression corresponding to the user's current facial expression (e.g., a matching facial expression). The illustrative method 300 begins with block 302 in which the computing device 102 determines whether the user is registered for a particular avatar. As such, in some embodiments, a particular user may register for multiple avatars. Accordingly, the avatar may choose which avatar to use in some embodiments. If the user has not registered for the avatar, the computing device 102 instructs the user to present a reference facial expression to the camera 132 (e.g., a neutral facial expression) in block 304.

In block 306, the computing device 102 captures one or more images of the user's reference facial expression using the camera 132. In block 308, the computing device 102 generates and stores facial comparison data corresponding with the reference facial expression (see FIG. 4). In other words, the computing device 102 registers the user for the particular avatar. If the computing device 102 determines in block 302 that the user has been registered for the avatar, the computing device 102 retrieves the user's facial comparison data for the avatar in block 310.

In block 312, the computing device 102 generates real-time facial geometry data of the user's current expression. In doing so, the computing device 102 captures a current real-time image of the user and extracts the facial geometry data of the real-time image as described above. In block 314, the computing device 102 generates real-time facial measurement data of the user's current expression based on the real-time facial geometry data. The computing device 102 generates modified expression data for the avatar in block 316. As discussed above, in some embodiments, the modified expression data comprises the facial measurement data for the modified expression of the avatar (i.e., the expression corresponding with the real-time facial expression of the user). In generating the modified expression data, the computing device 102 applies the facial comparison data to the real-time facial measurement data of the user's current expression in block 318.

In block 320, the computing device 102 renders and/or transmits the modified avatar using the modified expression data. As discussed above, in some embodiments, the avatar is rendered for display on the display 134 of the computing device 102, whereas in other embodiments, the avatar may be transmitted over the network 104 to another computing device 102 for display on the other computing device 102. Of course, in one embodiment in which the avatar is transmitted for display on a remote computing device, the computing device 102 transmits the modified expression data to the remote computing device rather than a rendered avatar.

Figure 4:
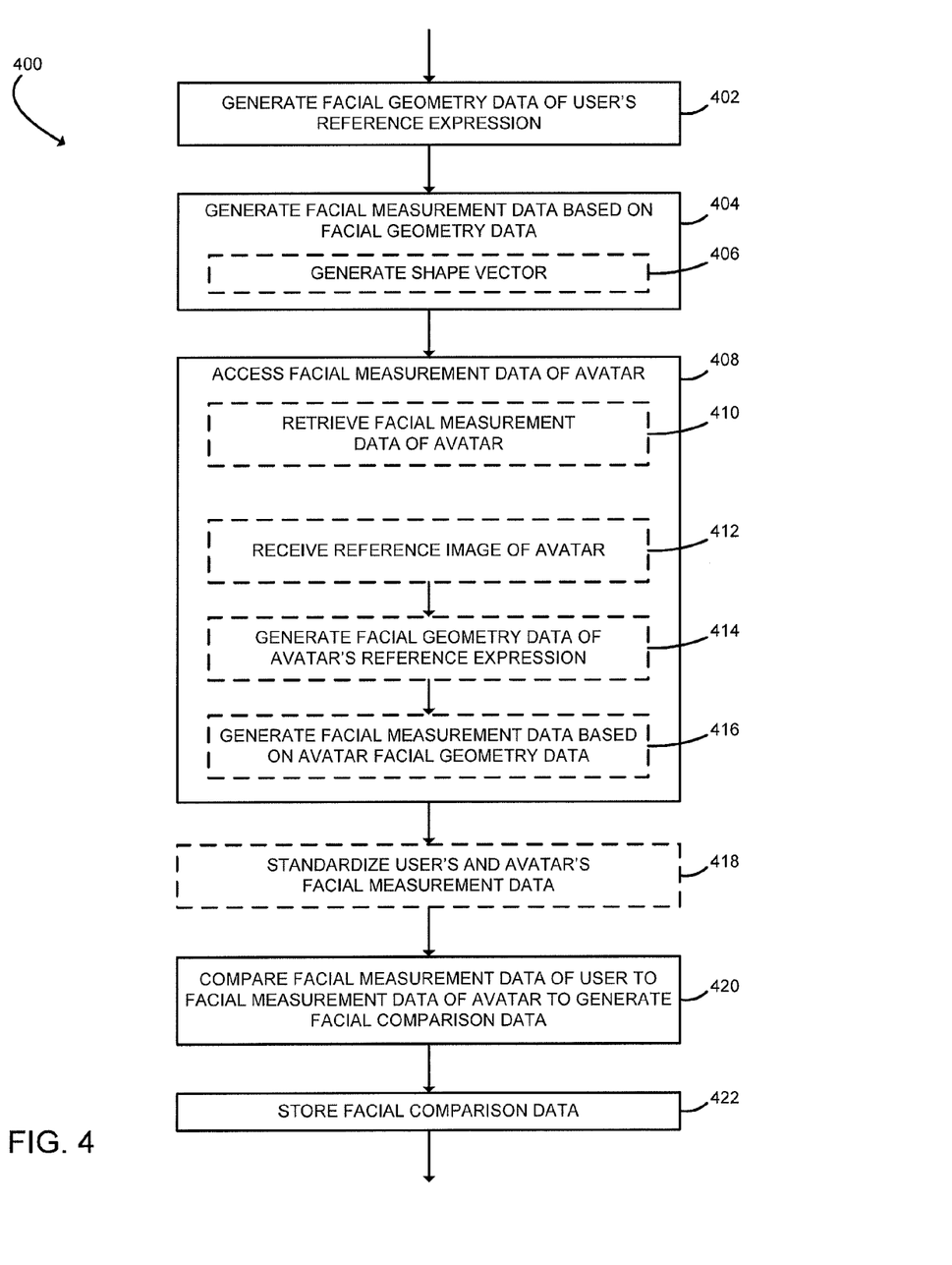
FIG. 4 is a simplified flow diagram of at least one embodiment of a method for generating and storing facial comparison data of a reference expression of a user and avatar on the computing device of the system of FIG. 1.

Referring now to FIG. 4, in use, the computing device 102 of the system 100 may execute a method 400 for generating and storing facial comparison data of a reference expression of a user and avatar. The method 400 begins with block 402 in which the computing device 102 generates facial geometry data of the user's reference expression. The reference expression may be, for example, a neutral facial expression or other distinguishable facial expression of the user (e.g., a smiling facial expression or frowning smiling expression). Further, as discussed above, the facial geometry data may be generated using a suitable feature extraction algorithm to identify geometric and/or topological markers on the image of the user's reference expression.

In block 404, the computing device 102 generates facial measurement data of the user's reference facial expression based on the generated facial geometry data. In doing so, in some embodiments, the computing device 102 may generate a shape vector in block 406. As discussed above, in other embodiments, the facial measurement data may be expressed in any other suitable form. In block 408, the computing device 102 accesses the facial measurement data of the avatar (i.e., the chosen avatar). The facial measurement data corresponds to an image of the avatar's reference expression. In other words, if the user's reference facial expression is a neutral facial expression, then the avatar's reference expression should also be a neutral facial expression. It should be appreciated that the computing device 102 may access the measurement data of the avatar's reference expression in various ways. In one embodiment, in block 410, the computing device 102 simply retrieves the facial measurement data associated with the avatar's reference expression (e.g., from the avatar database 106 over the network 104 or from the memory 124 or the data storage 128 of the computing device 102).

In another embodiment, the computing device 102 receives an image of the avatar with a reference facial expression (i.e., from the avatar database 106, the memory 124, or the data storage 128) and generates the facial measurement data of the avatar's reference facial expression similar to the facial measurement data of the user's reference facial expression. Specifically, in block 412, the computing device 102 receives the reference image of the avatar. In block 414, the computing device 102 generates facial geometry data of the avatar's reference expression based on the avatar image. Using that facial geometry data, the computing device 102 generates the facial measurement data in block 416.

As discussed above, in some embodiments, the computing device 102 must standardize or normalize the facial data (i.e., the facial geometry data and/or the facial measurement data) of the user and/or the avatar in block 418. Of course, in some embodiments, the standardization may occur coincident with or as part of the generation of the facial geometry data or the facial measurement data. For example, in one embodiment, the facial geometry data of the user's expression may indicate 17 points of interest (e.g., feature detection points or feature markers) and the facial geometry data of the avatar's expression may indicate 24 points of interest. The computing device 102 may standardize the facial geometry data of the two expressions such that each has the same number of points of interest (e.g., 17, 20, or 24). In doing so, the computing device 102 may utilize any suitable image-processing algorithm or process. For example, the computing device 102 may use interpolation (e.g., linear or polynomial interpolation), averaging, and/or best-fit algorithms.

In block 420, the computing device 102 compares the facial measurement data of the user's reference facial expression to the facial measurement data of the avatar's reference facial expression to generate facial comparison data. As discussed above, the computing device 102 may do so by subtracting the facial measurement data of the user's reference facial expression from the facial measurement data of the avatar's reference facial expression. Further, the facial comparison data may be used to generate an avatar with a facial expression corresponding (e.g., mimicking) to the real-time facial expression of the user. As such, the computing device 102 stores the facial comparison data in block 422.

Figure 5:
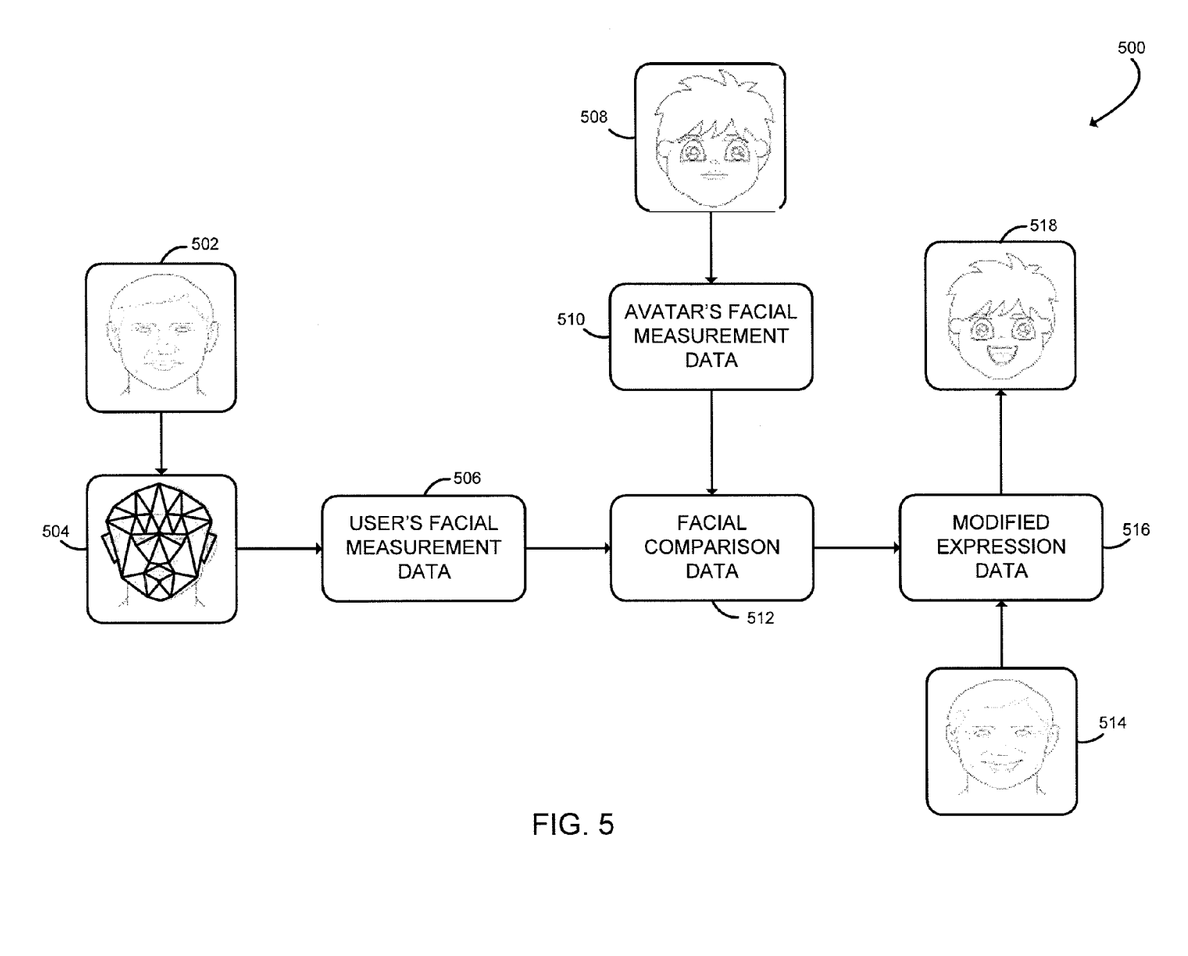
FIG. 5 is a simplified data flow diagram of at least one embodiment of a method for generating an avatar with a facial expression corresponding to a facial expression of a user on the computing device of the system of FIG. 1.
Figure 6:
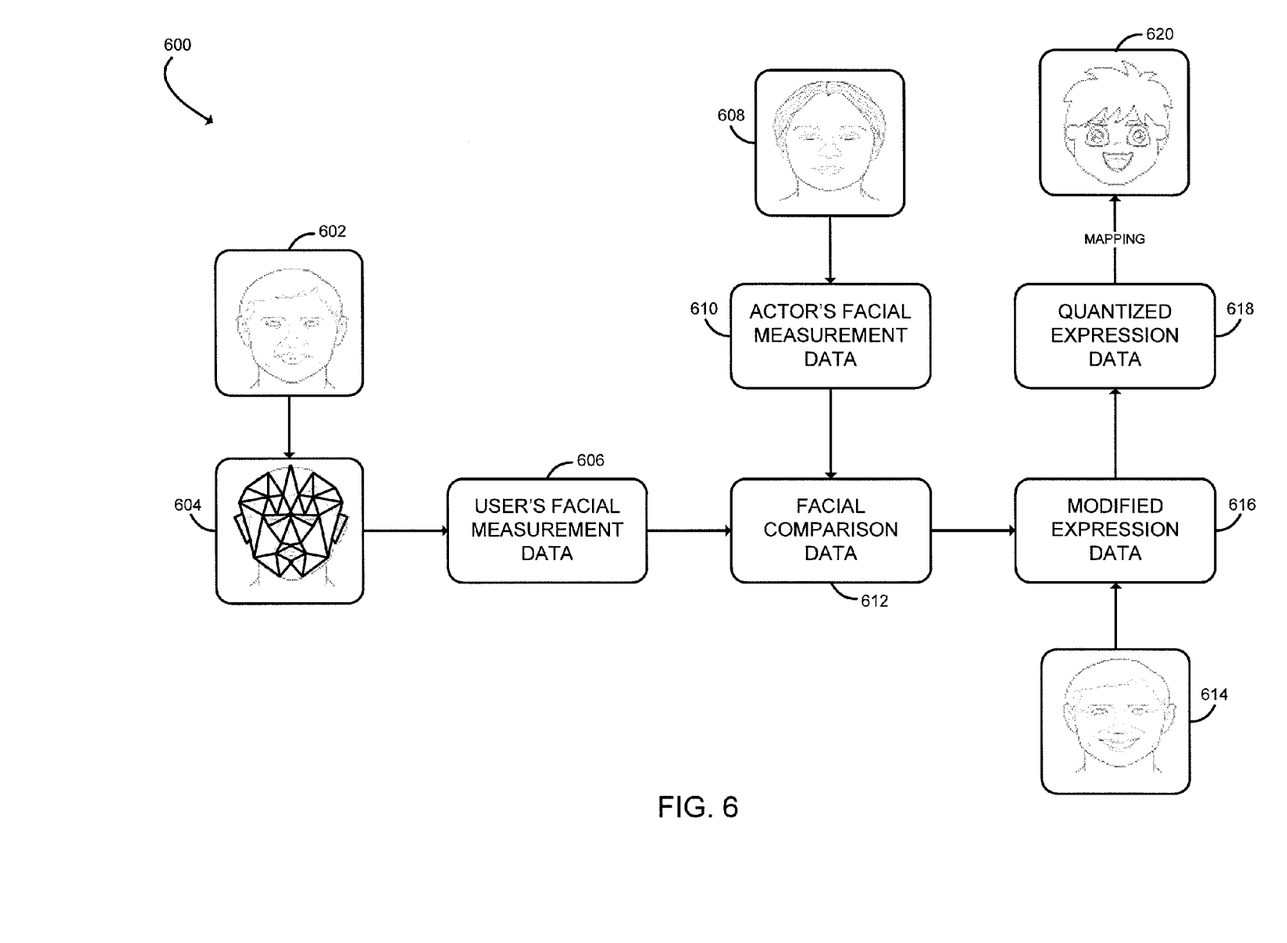
FIG. 6 is a simplified data flow diagram of at least one embodiment of a method generating an avatar with a facial expression corresponding to a facial expression of a user, using a database including facial expressions of an actor, on the computing device of the system of FIG. 1.

Simplified data flow diagrams of at least two embodiments of methods for generating an avatar with a facial expression corresponding to a facial expression of a user are illustrated in FIGS. 5 and 6. Referring now to FIG. 5, which corresponds with the method 300, the data flow 500 begins with block 502 in which the computing device 102 receives an image of the user's reference facial expression (e.g., using the camera 132). The computing device 102 generates facial geometry data for the user's reference facial expression in block 504, which is used to generate facial measurement data in block 506. In block 508, the computing device 102 receives an image of the selected avatar's reference facial expression (e.g., from the avatar database 106) and generates the associated facial measurement data in block 510 (e.g., using generated facial geometry data for the avatar's reference facial expression). As discussed above, in some embodiments, the computing device 102 may not receive an image of the avatar but receive the facial measurement data or facial geometry data of the avatar's reference facial expression instead. In block 512, the computing device 102 generates facial comparison data as a function of the user's facial measurement data and the avatar's facial measurement data. A real-time image of the user's current facial expression is captured in block 514, which is used with the facial comparison data to generate the modified expression data for the modified avatar in block 516. In block 518, the desired avatar is rendered as a function of the modified expression data.

As discussed above, in some embodiments, an image of an actor may be used rather than an image of an avatar to generate an avatar with a facial expression corresponding to a facial expression of a user. For example, the avatar database 106 may include various images of a particular actor and associate each of those images with a corresponding image of the avatar. That is, an image of the actor smiling may correspond with an image of the avatar smiling, and an image of the actor with a neutral facial expression may correspond with an image of the avatar with a neutral facial expression. In such an embodiment, a method similar to the method 300 may be implemented in which the user's facial expressions are compared to the actor's facial expressions rather than the avatar's facial expressions.

Referring now to FIG. 6, the data flow 600 begins with block 602 in which the computing device 102 receives an image of the user's reference facial expression (e.g., using the camera 132). The computing device 102 generates facial geometry data for the user's reference facial expression in block 604, which is used to generate facial measurement data in block 606. In block 508, the computing device 102 receives an image of the actor's reference facial expression (e.g., from the avatar database 106) and generates the associated facial measurement data in block 610 (e.g., using generated facial geometry data for the actor reference facial expression). Of course, in some embodiments, the computing device 102 may not receive an image of the actor but receive the facial measurement data or facial geometry data of the actor's reference facial expression instead. In block 612, the computing device 102 generates facial comparison data as a function of the user's facial measurement data and the actor's facial measurement data. A real-time image of the user's current facial expression is captured in block 614, which is used with the facial comparison data to generate the modified expression data for the modified actor in block 616. It should be appreciated that only a finite number of images of the actor may be stored on the avatar database 106. As such, in some embodiments, the modified expression data for the modified actor may not perfectly match the modified expression data (e.g., the facial measurement data or facial geometry data) for any of the stored actor images. Accordingly, the computing device 102 may quantize (also referred to as "discretize" or "round") the modified expression data for the modified actor to match that of one of the existing actor images in the avatar database 106 in block 618. Because the avatar database 106 maps each actor image to a corresponding avatar image, the computing device 102 is able to identify the desired avatar image and retrieve the avatar with the modified expression in block 620.

EXAMPLES

Illustrative examples of the technologies disclosed herein are provided below. An embodiment of the technologies may include any one or more, and any combination of, the examples described below.

Example 1 includes a computing device for generating an avatar with a facial expression corresponding to a facial expression of a user, the computing device comprising a camera to (i) capture a reference user image of a reference facial expression of the user and (ii) capture a real-time user image of a current facial expression of the user; an expression generation module to (i) generate reference facial measurement data, based on the reference user image, that defines measurements of facial features of the user, (ii) compare the reference facial measurement data with facial measurement data of a corresponding reference expression of the avatar to generate facial comparison data, (iii) generate real-time facial measurement data, based on the real-time user image, that defines measurements of facial features of the user, and (iv) apply the facial comparison data to the real-time facial measurement data to generate modified expression data; and a rendering module to generate the avatar having a facial expression corresponding to the current facial expression of the user as a function of the modified expression data.

Example 2 includes the subject matter of Example 1, and wherein the reference user image is an image of a neutral facial expression of the user.

Example 3 includes the subject matter of any of Examples 1 and 2, and wherein the expression generation module is to generate reference facial geometry data, based on the reference user image, that defines the facial features of the user; and generate the reference facial measurement data as a function of the reference facial geometry data.

Example 4 includes the subject matter of any of Examples 1-3, and wherein the reference facial measurement data comprises a shape vector.

Example 5 includes the subject matter of any of Examples 1-4, and wherein to generate the facial comparison data comprises to subtract the reference facial measurement data from the facial measurement data of the corresponding reference expression of the avatar.

Example 6 includes the subject matter of any of Examples 1-5, and wherein to apply the facial comparison data comprises to add the facial comparison data to the real-time facial measurement data to generate the modified expression data.

Example 7 includes the subject matter of any of Examples 1-6, wherein the reference facial measurement data comprises a first shape vector and the facial measurement data of the corresponding reference expression of the avatar comprises a second shape vector.

Example 8 includes the subject matter of any of Examples 1-7, and wherein the expression generation module is to (i) receive a reference avatar image of the reference expression of the avatar and (ii) generate the facial measurement data of the corresponding reference expression of the avatar based on the reference avatar image.

Example 9 includes the subject matter of any of Examples 1-8, and wherein the expression generation module is to generate facial geometry data of the reference expression of the avatar, based on the reference avatar image, that defines the facial features of the avatar; and generate the facial measurement data of the corresponding reference expression of the avatar as a function of the facial geometry data of the reference expression of the avatar.

Example 10 includes the subject matter of any of Examples 1-9, and wherein the expression generation module is to standardize the reference facial measurement data and the facial measurement data of the corresponding reference expression of the avatar to generate reference facial measurement data and facial measurement data of the corresponding reference expression of the avatar with a same number of measurements of the facial features.

Example 11 includes a method for generating an avatar with a facial expression corresponding to a facial expression of a user, the method comprising generating, on a computing device, reference facial measurement data, based on a reference user image of a reference facial expression of the user, that defines measurements of facial features of the user; generating, on the computing device, facial comparison data by comparing the reference facial measurement data to facial measurement data of a corresponding reference expression of the avatar; generating, on the computing device, real-time facial measurement data, based on a real-time user image of a current facial expression of the user, that defines measurements of facial features of the user; generating, on the computing device, modified expression data by applying the facial comparison data to the real-time facial measurement data; and rendering, on the computing device, the avatar having a facial expression corresponding to the current facial expression of the user as a function of the modified expression data.

Example 12 includes the subject matter of Example 11, and wherein generating the reference facial measurement data comprises generating reference facial measurement data based on a reference user image of a neutral facial expression of the user.

Example 13 includes the subject matter of any of Examples 11 and 12, and further including generating reference facial geometry data, based on the reference user image, that defines the facial features of the user, and wherein generating the reference facial measurement data comprises generating reference facial measurement data as a function of the reference facial geometry data.

Example 14 includes the subject matter of any of Examples 11-13, and wherein generating the reference facial measurement data comprises generating a shape vector.

Example 15 includes the subject matter of any of Examples 11-14, and wherein generating the facial comparison data comprises subtracting the reference facial measurement data from the facial measurement data of the corresponding reference expression of the avatar.

Example 16 includes the subject matter of any of Examples 11-15, and wherein generating the facial comparison data comprises subtracting a first shape vector from a second shape vector, the reference facial measurement data being the first shape vector and the facial measurement data of the corresponding reference expression of the avatar being the second shape vector.

Example 17 includes the subject matter of any of Examples 11-16, and wherein generating the modified expression data comprises adding the facial comparison data to the real-time facial measurement data.

Example 18 includes the subject matter of any of Examples 11-17, and wherein generating the modified expression data comprises adding a first shape vector to a second shape vector, the facial comparison data being the first shape vector and the real-time facial measurement data being the second shape vector.

Example 19 includes the subject matter of any of Examples 11-18, and further including receiving, with the computing device, a reference avatar image of the reference expression of the avatar; and generating, on the computing device, facial measurement data of the corresponding reference expression of the avatar based on the reference avatar image.

Example 20 includes the subject matter of any of Examples 11-19, and further including generating facial geometry data of the reference expression of the avatar, based on the reference avatar image, that defines the facial features of the avatar; and wherein generating the facial measurement data of the corresponding reference expression of the avatar comprises generating facial measurement data of the corresponding reference expression of the avatar as a function of the facial geometry data of the reference expression of the avatar.

Example 21 includes the subject matter of any of Examples 11-20, and further including standardizing, on the computing device, the reference facial measurement data and the facial measurement data of the corresponding reference expression of the avatar by generating reference facial measurement data and facial measurement data of the corresponding reference expression of the avatar with a same number of measurements of the facial features.

Example 22 includes the subject matter of any of Examples 11-21, and further including capturing, with a camera of the computing device, the reference user image and the real-time user image.

Example 23 includes a computing device comprising a processor; and a memory having stored therein a plurality of instructions that when executed by the processor cause the computing device to perform the method of any of Examples 11-22.

Example 24 includes one or more machine readable storage media comprising a plurality of instructions stored thereon that in response to being executed result in a computing device performing the method of any of Examples 11-22.

Example 25 includes a computing device for generating an avatar with a facial expression corresponding to a facial expression of a user, the computing device comprising means for generating reference facial measurement data, based on a reference user image of a reference facial expression of the user, that defines measurements of facial features of the user; means for generating facial comparison data by comparing the reference facial measurement data to facial measurement data of a corresponding reference expression of the avatar; means for generating real-time facial measurement data, based on a real-time user image of a current facial expression of the user, that defines measurements of facial features of the user; means for generating modified expression data by applying the facial comparison data to the real-time facial measurement data; and means for rendering the avatar having a facial expression corresponding to the current facial expression of the user as a function of the modified expression data.

Example 26 includes the subject matter of Example 25, and wherein the means for generating the reference facial measurement data comprises means for generating reference facial measurement data based on a reference user image of a neutral facial expression of the user.

Example 27 includes the subject matter of any of Examples 25 and 26, and further including means for generating reference facial geometry data, based on the reference user image, that defines the facial features of the user, and wherein the means for generating the reference facial measurement data comprises means for generating reference facial measurement data as a function of the reference facial geometry data.

Example 28 includes the subject matter of any of Examples 25-27, and wherein the means for generating the reference facial measurement data comprises means for generating a shape vector.

Example 29 includes the subject matter of any of Examples 25-28, and wherein the means for generating the facial comparison data comprises means for subtracting the reference facial measurement data from the facial measurement data of the corresponding reference expression of the avatar.

Example 30 includes the subject matter of any of Examples 25-29, and wherein the means for generating the modified expression data comprises means for adding the facial comparison data to the real-time facial measurement.

Example 31 includes the subject matter of any of Examples 25-30, and wherein the reference facial measurement data comprises a first shape vector and the facial measurement data of the corresponding reference expression of the avatar comprises a second shape vector.

Example 32 includes the subject matter of any of Examples 25-31, and further including means for receiving a reference avatar image of the reference expression of the avatar; and means for generating facial measurement data of the corresponding reference expression of the avatar based on the reference avatar image.

Example 33 includes the subject matter of any of Examples 25-32, and further including means for generating facial geometry data of the reference expression of the avatar, based on the reference avatar image, that defines the facial features of the avatar; and wherein the means for generating the facial measurement data of the corresponding reference expression of the avatar comprises means for generating facial measurement data of the corresponding reference expression of the avatar as a function of the facial geometry data of the reference expression of the avatar.

Example 34 includes the subject matter of any of Examples 25-33, and further including means for standardizing the reference facial measurement data and the facial measurement data of the corresponding reference expression of the avatar by generating reference facial measurement data and facial measurement data of the corresponding reference expression of the avatar with a same number of measurements of the facial features.

Example 35 includes the subject matter of any of Examples 25-34, and further including means for capturing the reference user image and the real-time user image.

Example 36 includes a computing device for generating a desired avatar with a facial expression corresponding to a facial expression of a user using a database including a plurality of facial expressions of an actor, the computing device comprising a camera to (i) capture a reference user image of a reference facial expression of the user and (ii) capture a real-time user image of a current facial expression of the user; an expression generation module to (i) generate reference facial measurement data, based on the reference user image, that defines measurements of facial features of the user, (ii) compare the reference facial measurement data with facial measurement data of a corresponding reference expression of the actor to generate facial comparison data, (iii) generate real-time facial measurement data, based on the real-time user image, that defines measurements of facial features of the user, (iv) apply the facial comparison data to the real-time facial measurement data to generate modified expression data, and (v) select a facial expression of the actor from the plurality of facial expressions corresponding with the modified expression data; and a rendering module to select an avatar from the database corresponding to the selected facial expression of the actor to generate the desired avatar, each of the plurality of facial expressions of the actor being mapped to an avatar having a corresponding facial expression.

Example 37 includes the subject matter of Example 36, and wherein the expression generation module is to quantize the modified expression data to correspond with a closest match of the plurality of facial expressions of the actor.

Example 38 includes the subject matter of any of Examples 36 and 37, and wherein the reference user image is an image of a neutral facial expression of the user.

Example 39 includes the subject matter of any of Examples 36-38, and wherein the reference facial measurement data comprises a shape vector.

Example 40 includes a method for generating a desired avatar with a facial expression corresponding to a facial expression of a user using a database including a plurality of facial expressions of an actor, the method comprising generating, on a computing device, reference facial measurement data, based on the reference user image, that defines measurements of facial features of the user; generating, on the computing device, facial comparison data by comparing the reference facial measurement data to facial measurement data of a corresponding reference expression of the actor; generating, on the computing device, real-time facial measurement data, based on the real-time user image, that defines measurements of facial features of the user; generating, on the computing device, modified expression data by applying the facial comparison data to the real-time facial measurement data; selecting, on the computing device, a facial expression of the actor from the plurality of facial expressions corresponding with the modified expression data; and generating, on the computing device, the desired avatar by selecting an avatar from the database corresponding to the selected facial expression of the actor, each of the plurality of facial expressions of the actor being mapped to an avatar having a corresponding facial expression.

Example 41 includes the subject matter of Example 40, and further including quantizing the modified expression data to correspond with a closest match of the plurality of facial expressions of the actor.

Example 42 includes the subject matter of any of Examples 40 and 41, and wherein generating the reference facial measurement data comprises generating reference facial measurement data based on a reference user image of a neutral facial expression of the user.

Example 43 includes the subject matter of any of Examples 40-42, and wherein generating the reference facial measurement data comprises generating a shape vector.

Example 44 includes a computing device comprising a processor; and a memory having stored therein a plurality of instructions that when executed by the processor cause the computing device to perform the method of any of Examples 40-43.

Example 45 includes one or more machine readable storage media comprising a plurality of instructions stored thereon that in response to being executed result in a computing device performing the method of any of Examples 40-43.

Example 46 includes a computing device for generating a desired avatar with a facial expression corresponding to a facial expression of a user using a database including a plurality of facial expressions of an actor, the computing device comprising means for generating reference facial measurement data, based on the reference user image, that defines measurements of facial features of the user; means for generating facial comparison data by comparing the reference facial measurement data to facial measurement data of a corresponding reference expression of the actor; means for generating real-time facial measurement data, based on the real-time user image, that defines measurements of facial features of the user; means for generating modified expression data by applying the facial comparison data to the real-time facial measurement data; means for selecting a facial expression of the actor from the plurality of facial expressions corresponding with the modified expression data; and means for generating the desired avatar by selecting an avatar from the database corresponding to the selected facial expression of the actor, each of the plurality of facial expressions of the actor being mapped to an avatar having a corresponding facial expression.

Example 47 includes the subject matter of Example 46, and further including means for quantizing the modified expression data to correspond with a closest match of the plurality of facial expressions of the actor.

Example 48 includes the subject matter of any of Examples 46 and 47, and wherein the means for generating the reference facial measurement data comprises means for generating reference facial measurement data based on a reference user image of a neutral facial expression of the user.

Example 49 includes the subject matter of any of Examples 46-48, and wherein the means for generating the reference facial measurement data comprises means for generating a shape vector.

The invention claimed is:

1. A computing device for generating an avatar with a facial expression corresponding to a facial expression of a user, the computing device comprising:
    a camera to capture a reference user image of a reference facial expression of the user and capture a real-time user image of a current facial expression of the user;
    an expression generation module to:
        transform the reference user image from a first perspective to a second perspective, wherein the second perspective is a perspective of a corresponding reference expression of the avatar,
        transform the reference user image from a first depth to a second depth, wherein the second depth is a plane on which the reference expression of the avatar is located;
        generate reference facial measurement data, based on the transformed reference user image, that defines distances between facial features of the user as indicated in the transformed reference user image,
        perform feature extraction on an image of the reference expression of the avatar to identify facial features of the avatar,
        determine distances between the identified facial features of the avatar to generate facial measurement data of the reference expression of the avatar,
        compare the reference facial measurement data with the facial measurement data of the corresponding reference expression of the avatar to generate facial comparison data,
        generate real-time facial measurement data, based on the real-time user image, that defines distances between facial features of the user as captured in the real-time user image, and
        apply the facial comparison data to the real-time facial measurement data to generate modified expression data; and
    a rendering module to generate the avatar having a facial expression corresponding to the current facial expression of the user as a function of the modified expression data.

2. The computing device of claim 1, wherein the reference user image is an image of a neutral facial expression of the user.

3. The computing device of claim 1, wherein the expression generation module is to:
    generate reference facial geometry data, based on the reference user image, that defines the facial features of the user; and
    generate the reference facial measurement data as a function of the reference facial geometry data.

4. The computing device of claim 1, wherein the reference facial measurement data comprises a shape vector.

5. The computing device of claim 1, wherein to generate the facial comparison data comprises to subtract the reference facial measurement data from the facial measurement data of the corresponding reference expression of the avatar; and wherein to apply the facial comparison data comprises to add the facial comparison data to the real-time facial measurement data to generate the modified expression data.

6. The computing device of claim 5, wherein the reference facial measurement data comprises a first shape vector and the facial measurement data of the corresponding reference expression of the avatar comprises a second shape vector.

7. The computing device of claim 1, wherein the expression generation module is to standardize the reference facial measurement data and the facial measurement data of the corresponding reference expression of the avatar to generate reference facial measurement data and facial measurement data of the corresponding reference expression of the avatar with a same number of measurements of the facial features.

8. The computing device of claim 1, wherein to perform the feature extraction on an image of the reference expression of the avatar comprises to:

determine whether a feature extraction algorithm is unable to identify one or more facial features from the image of the reference expression of the avatar; and obtain, in response to a determination that the feature extraction algorithm is unable to identify one or more facial features from the image of the reference expression of the avatar, facial geometry data indicative of the facial features from an avatar database associated with the avatar.

9. The computing device of claim 1, wherein the expression generation module is further to:

perform feature extraction on multiple images of the avatar, wherein each image is representative of the avatar with a different facial expression; and determine distances between the identified facial features of the avatar for each facial expression to generate facial measurement data for each facial expression of the avatar.

10. One or more non-transitory machine-readable storage media comprising a plurality of instructions stored thereon that, in response to being executed, result in a computing device:

transforming a reference user image of a reference facial expression of a user from a first perspective to a second perspective, wherein the second perspective is a perspective of a corresponding reference expression of an avatar;

transforming the reference user image from a first depth to a second depth, wherein the second depth is a plane on which the reference expression of the avatar is located;

generating reference facial measurement data, based on the transformed reference user image, that defines distances between facial features of the user as indicated in the transformed reference user image;

performing feature extraction on an image of the reference expression of the avatar to identify facial features of the avatar;

determining distances between the identified facial features of the avatar to generate facial measurement data of the reference expression of the avatar;

generating facial comparison data by comparing the reference facial measurement data to the facial measurement data of the corresponding reference expression of the avatar;

generating real-time facial measurement data, based on a real-time user image of a current facial expression of the user, that defines distances between facial features of the user as captured in the real-time user image;

generating modified expression data by applying the facial comparison data to the real-time facial measurement data; and rendering the avatar having a facial expression corresponding to the current facial expression of the user as a function of the modified expression data.

11. The one or more non-transitory machine-readable storage media of claim 10, wherein the plurality of instructions further result in the computing device generating reference facial geometry data, based on the reference user image, that defines the facial features of the user, and wherein generating the reference facial measurement data comprises generating reference facial measurement data as a function of the reference facial geometry data.

12. The one or more non-transitory machine-readable storage media of claim 10, wherein generating the facial comparison data comprises subtracting a first shape vector from a second shape vector, the reference facial measurement data being the first shape vector and the facial measurement data of the corresponding reference expression of the avatar being the second shape vector.

13. The one or more non-transitory machine-readable storage media of claim 10, wherein generating the modified expression data comprises adding a first shape vector to a second shape vector, the facial comparison data being the first shape vector and the real-time facial measurement data being the second shape vector.

14. A method for generating an avatar with a facial expression corresponding to a facial expression of a user, the method comprising:

transforming, on a computing device, a reference user image of a reference facial expression of a user from a first perspective to a second perspective, wherein the second perspective is a perspective of a corresponding reference expression of an avatar;

transforming, on the computing device, the reference user image from a first depth to a second depth, wherein the second depth is a plane on which the reference expression of the avatar is located;

generating, on the computing device, reference facial measurement data, based on the transformed reference user image, that defines distances between facial features of the user as indicated in the transformed reference user image;

performing, on the computing device, feature extraction on an image of the reference expression of the avatar to identify facial features of the avatar;

determining, on the computing device, distances between the identified facial features of the avatar to generate facial measurement data of the reference expression of the avatar;

generating, on the computing device, facial comparison data by comparing the reference facial measurement data to the facial measurement data of the corresponding reference expression of the avatar;

generating, on the computing device, real-time facial measurement data, based on a real-time user image of a current facial expression of the user, that defines distances between facial features of the user as captured in the real-time user image;

generating, on the computing device, modified expression data by applying the facial comparison data to the real-time facial measurement data; and rendering, on the computing device, the avatar having a facial expression corresponding to the current facial expression of the user as a function of the modified expression data.

15. The method of claim 14, further comprising generating reference facial geometry data, based on the reference user image, that defines the facial features of the user, and wherein generating the reference facial measurement data comprises generating reference facial measurement data as a function of the reference facial geometry data.

16. The method of claim 14, wherein generating the facial comparison data comprises subtracting a first shape vector from a second shape vector, the reference facial measurement data being the first shape vector and the facial measurement data of the corresponding reference expression of the avatar being the second shape vector.

17. The method of claim 14, wherein generating the modified expression data comprises adding a first shape vector to a second shape vector, the facial comparison data being the first shape vector and the real-time facial measurement data being the second shape vector.

18. The method of claim 14, further comprising capturing, with a camera of the computing device, the reference user image and the real-time user image.

19. A computing device for generating a desired avatar with a facial expression corresponding to a facial expression of a user using a database including a plurality of facial expressions of an actor, the computing device comprising:

a camera to capture a reference user image of a reference facial expression of the user and capture a real-time user image of a current facial expression of the user;

an expression generation module to:

transform the reference user image from a first perspective to a second perspective, wherein the second perspective is a perspective of a corresponding reference expression of the actor, transform the reference user image from a first depth to a second depth, wherein the second depth is a plane on which the reference expression of the actor is located;

generate reference facial measurement data, based on the transformed reference user image, that defines distances between facial features of the user as indicated in the transformed reference user image, perform feature extraction on an image of the reference expression of the actor to identify facial features of the avatar, determine distances between the identified facial features of the avatar to generate facial measurement data of the reference expression of the actor, compare the reference facial measurement data with the facial measurement data of the corresponding reference expression of the actor to generate facial comparison data, generate real-time facial measurement data, based on the real-time user image, that defines distances between facial features of the user as captured in the real-time user image, apply the facial comparison data to the real-time facial measurement data to generate modified expression data, and select a facial expression of the actor from the plurality of facial expressions corresponding with the modified expression data; and a rendering module to select an avatar from the database corresponding to the selected facial expression of the actor to generate the desired avatar, each of the plurality of facial expressions of the actor being mapped to an avatar having a corresponding facial expression.

* * * * *